(12) United States Patent
Chin

(10) Patent No.: US 7,020,712 B1
(45) Date of Patent: Mar. 28, 2006

(54) REDUCING CPU OVERHEAD IN THE FORWARDING PROCESS IN AN INBOUND/OUTBOUND CONTROLLER FOR A ROUTER

(75) Inventor: Hon Wah Chin, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 577 days.

(21) Appl. No.: 09/164,388

(22) Filed: Sep. 30, 1998

(51) Int. Cl.
G06F 15/173 (2006.01)

(52) U.S. Cl. .................................... 709/234
(58) Field of Classification Search ............... 709/249, 709/250, 234; 370/911, 218, 299, 360, 359
See application file for complete search history.

(56) References Cited

U.S. PATENT DOCUMENTS

| | | | | |
|---|---|---|---|---|
| 5,099,517 A | * | 3/1992 | Gupta et al. .................. 380/29 |
| 5,177,480 A | * | 1/1993 | Clark .......................... 341/51 |
| 5,319,712 A | * | 6/1994 | Finkelstein et al. ........... 380/44 |
| 5,333,269 A | * | 7/1994 | Calvignac et al. .......... 709/215 |
| 5,392,401 A | * | 2/1995 | Barucchi et al. ............ 709/225 |
| 5,524,254 A | | 6/1996 | Morgan et al. |
| 5,907,717 A | * | 5/1999 | Ellis ............................ 710/56 |
| 5,920,568 A | * | 7/1999 | Kurita et al. ................ 370/412 |
| 5,925,099 A | * | 7/1999 | Futral et al. ................ 709/204 |
| 6,101,170 A | * | 8/2000 | Doherty et al. .............. 370/255 |
| 6,134,619 A | * | 10/2000 | Futral et al. ................. 710/112 |
| 6,157,623 A | * | 12/2000 | Kerstein ..................... 370/315 |
| 6,487,212 B1 | * | 11/2002 | Erimli et al. ................ 370/413 |

* cited by examiner

Primary Examiner—Beatriz Prieto
(74) Attorney, Agent, or Firm—Beyer Weaver & Thomas LLP

(57) ABSTRACT

A method and system for transferring a queue of packets in a router between an inbound controller and an outbound controller is disclosed. The inbound controller is adapted for receiving an inbound packet at an inbound port. In addition, a plurality of inbound queues are provided for the inbound port. An inbound packet is then received at the inbound port. The inbound packet is classified in a selected one of the plurality of inbound queues according to packet sorting criteria. The inbound packet is then stored in the selected one of the plurality of inbound queues. The inbound controller is capable of determining when one of the plurality of inbound queues is ready to be moved to an outbound queue which is capable of storing a multiplicity of inbound queues. The outbound controller is adapted for forwarding packets at an outbound port. At least one outbound queue is provided for the outbound port which is capable of storing a plurality of inbound queues. The outbound controller is capable of receiving a notification to handle an inbound queue storing a plurality of packets. The inbound queue is then transferred to the outbound queue. The outbound controller may then transmit packets stored in the outbound queue. A CPU may control the inbound controller and the outbound controller.

53 Claims, 12 Drawing Sheets

| Queue 10 | Destination Address | Priority |
|---|---|---|
| A | Port 3 | 2 |
| B | Port 4 | 1 |
| C | Port 3 | 1 |
| D | Port 4 | 2 |

REDUCING CPU OVERHEAD IN THE FORWARDING PROCESS IN AN INBOUND/OUTBOUND CONTROLLER FOR A ROUTER

BACKGROUND OF THE INVENTION

1. Field of the Invention

The present invention relates to packet forwarding. More particularly, the present invention relates to forwarding packets through manipulating multiple queues of packets.

2. Description of the Related Art

Routers are commonly used to forward packets within a network. Routers typically include a CPU, a memory, and a plurality of inbound and outbound ports. Typically, data is received at an inbound port as a packet. When a packet is received at an inbound port, it is ultimately filtered or forwarded via an outbound port.

FIG. 1 is a block diagram illustrating a conventional router 102. Rather than sending each packet as it is received at an inbound port 104-1, 104-2, packets are typically stored in a single inbound queue 106-1, 106-2 via a hardware inbound interface, or "controller," associated with the corresponding inbound port 104-1, 104-2. When the CPU wakes up, it obtains a packet from the inbound queue 104-1, 104-2 classifies, and transfers the packet to a hardware outbound interface, or "controller." The hardware outbound interface then stores the packet in an outbound queue 108-1, 108-2 associated with an outbound port 110-1, 110-2. Transferring may be accomplished through moving the packet or simply modifying a pointer to the packet. The outbound interface then forwards the packet. Typically, this is performed for each packet.

In order to send each packet stored in the inbound queue, the packets must be transferred to the appropriate outbound queue. Often, each peripheral interface is designed for use with a particular protocol (e.g., Ethernet) and therefore a particular representation, or data structure. Thus, the inbound interface and the outbound interface often have incompatible data structures. By way of example, queue descriptions for the inbound interface and the outbound interface often have different formats. Thus, the CPU must translate the packets stored in the inbound queue to an outbound representation compatible with the outbound interface. The packet is then transferred to an outbound queue associated with an outbound port. Accordingly, it would be desirable if the inbound interface and the outbound interface could be designed to provide compatible data structures, thereby facilitating the transfer of data between the inbound and the outbound controller.

Inbound controllers typically store packets as they are received in a single inbound queue. FIG. 2 is a block diagram illustrating a router having a conventional inbound and outbound controller. As shown, data 202 is received by an inbound controller 204. The inbound controller 204 then stores this data 202 (e.g., packet) in memory 206 in an inbound queue 208. The inbound queue 208 includes a plurality of queue entries 210 corresponding to a plurality of packets. By way of example, each one of the plurality of packets may be stored in a packet buffer 212. In order to forward each packet stored in the inbound queue 208, the CPU must transfer each entry 210 in the inbound queue 208 to an outbound queue 214 associated with an outbound controller 216. The outbound queue 214 similarly includes a plurality of queue entries 218 corresponding to a plurality of packets. Thus, an entry 210 in the inbound queue 208 may be transferred to the outbound queue 214 through modifying a pointer to a packet buffer 220 associated with an entry being transferred.

Since each packet is individually transferred from the inbound controller to the outbound controller, this produces a substantial burden on the CPU and a low packet per second forwarding rate. By way of example, each queue entry in both the inbound and the outbound queues may include a packet descriptor and a pointer to a packet buffer that holds data for the packet. Thus, transferring a single packet may require that a pointer to the transferred packet be added to the outbound queue as well as removed from the inbound queue. In addition, any packet descriptors must similarly be transferred. Since the transfer of each packet requires that several steps be performed, the burden on the CPU is substantial. Thus, it would be desirable if an inbound interface for a router could be designed which would reduce this burden on the CPU while maximizing the packet per second forwarding rate. Accordingly, it would be beneficial if entire queues could be transferred between the inbound controller and the outbound controller rather than individual packets, thereby increasing the throughput of a router.

Classification of packets similarly increases the burden on the CPU. While inbound controllers and outbound controllers are typically implemented in hardware, classification of packets is typically performed in software. Thus, numerous CPU cycles are commonly dedicated to such classification. Accordingly, it would be beneficial if an inbound interface could be implemented in hardware such that each inbound packet were sorted into an inbound queue corresponding sorting criteria such as the source address and the destination address of the packet.

Once each packet is sent by the outbound controller, the CPU often deallocates the corresponding packet buffer. Thus, this deallocation is typically performed for each packet individually. However, it would be beneficial if the memory could be deallocated and reused in a more efficient manner. Accordingly, it would be desirable if an outbound interface for a router could be designed which would reduce the number of CPU cycles dedicated to the deallocation of these buffers.

In addition to dedicating numerous CPU cycles to transferring packets between an inbound controller and an outbound controller, classifying packets, and deallocating packet buffers associated with the packets, these packet buffers typically consume a considerable amount of memory. A packet buffer is typically preallocated for each entry in an inbound queue. Since all of these packet buffers may not be utilized consistently, a portion of these dedicated buffers often remain unused. Accordingly, it would be desirable to reduce the amount of memory required and therefore the production costs associated with each router.

SUMMARY OF THE INVENTION

The present invention provides methods and apparatus for transferring a queue of packets from an inbound port to an outbound port within a router. This is accomplished through providing an inbound controller and an outbound controller which are controlled by a CPU. In this manner, a plurality of packets may be simultaneously transferred between the inbound controller and the outbound controller, thereby reducing CPU overhead in the forwarding process.

According to one aspect of the invention, a router includes an inbound controller. The router includes a plurality of inbound ports and a plurality of outbound ports, a memory, and a CPU. The inbound controller is adapted for receiving an inbound packet at one of the plurality of inbound ports. A plurality of inbound queues are provided for one of the plurality of inbound ports. An inbound packet is then received at the one of the plurality of inbound ports. A classifier classifies the inbound packet in a selected one of the plurality of inbound queues according to packet sorting criteria. The inbound packet is then stored in the selected one of the plurality of inbound queues. The inbound controller is capable of determining when one of the plurality of inbound queues is ready to be moved to an outbound queue which is capable of storing a multiplicity of inbound queues.

According to another aspect of the invention, an outbound controller is provided. The outbound controller is adapted for forwarding packets at one of the plurality of outbound ports of a router. At least one outbound queue is provided for one of the plurality of outbound ports which is capable of storing a plurality of inbound queues. The outbound controller is capable of receiving a notification to handle an inbound queue storing a plurality of packets. The inbound queue is then transferred to an outbound queue. By way of example, the outbound controller may include an outbound classifier that classifies the inbound queue in one of a plurality of outbound queues.

According to yet another aspect of the invention, the present invention may be implemented in an encryption system. The encryption system includes an inbound controller adapted for receiving an inbound packet. A first classifier is coupled to the inbound controller and adapted for classifying and storing the inbound packet in an inbound queue. An outbound controller is adapted for receiving the inbound queue. In addition, an encryption box is coupled to the outbound controller. The encryption box is adapted for encrypting the inbound queue to provide an encrypted inbound queue to the outbound controller for transmission. In addition, the outbound controller may include a second classifier that classifies the encrypted inbound queue in an outbound queue. The outbound controller may then transmit data stored in the outbound queue.

A CPU controls the inbound controller and the outbound controller. Thus, through combining software and hardware modules, the present invention provides efficient and accurate packet forwarding. Hardware may be utilized to provide speed where global knowledge is not required. By way of example, a hardware classifier may provide an increased forwarding rate. At the same time, software provides global knowledge and intelligence in forwarding decisions to increase the efficiency of the forwarding process.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

An invention is described herein that reduces the burden on the CPU and therefore increases the packet per second forwarding rate within a router. This is accomplished through providing an inbound controller and an outbound controller which store packets in compatible formats such that a set of packets (e.g., queue of packets) may be transferred between the inbound controller and the outbound controller. In accordance with one embodiment, the present invention provides multiple inbound queues associated with each inbound port. Each of these inbound queues corresponds to a set of packet sorting criteria (e.g., destination address and/or priority). The inbound interface then sorts inbound packets received at an inbound port into one of these inbound queues according to packet sorting data associated with the packet sorting criteria. By way of example, the destination address of the packet as well as the priority of the packet may be obtained and utilized to select the appropriate inbound queue. An outbound queue is provided for each outbound port. The CPU may then transfer each inbound queue to the outbound queue corresponding to the inbound queue classification (e.g., destination address of the packet) such the inbound queues are sorted according to the priority of the inbound queue.

Figure 1:
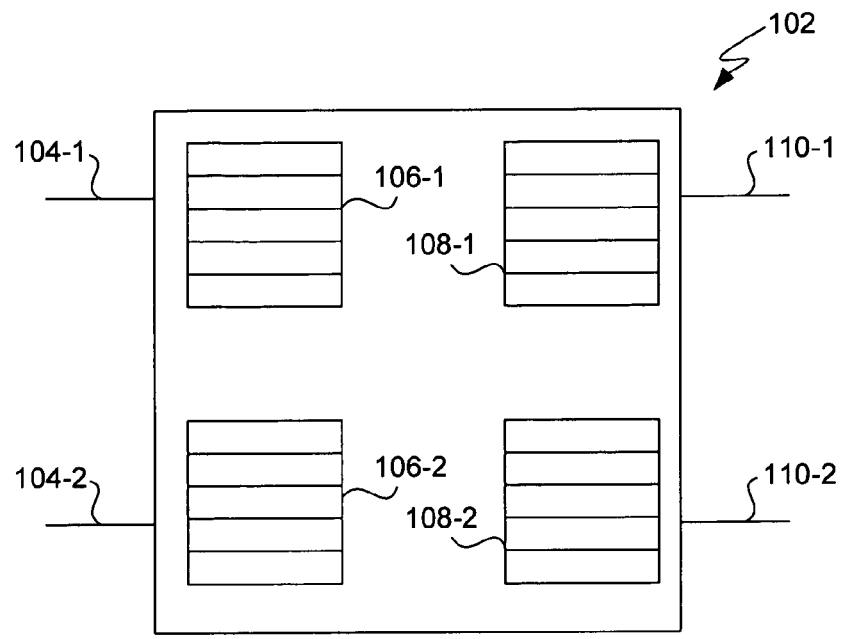
FIG. 1 is a block diagram illustrating a conventional router.
Figure 2:
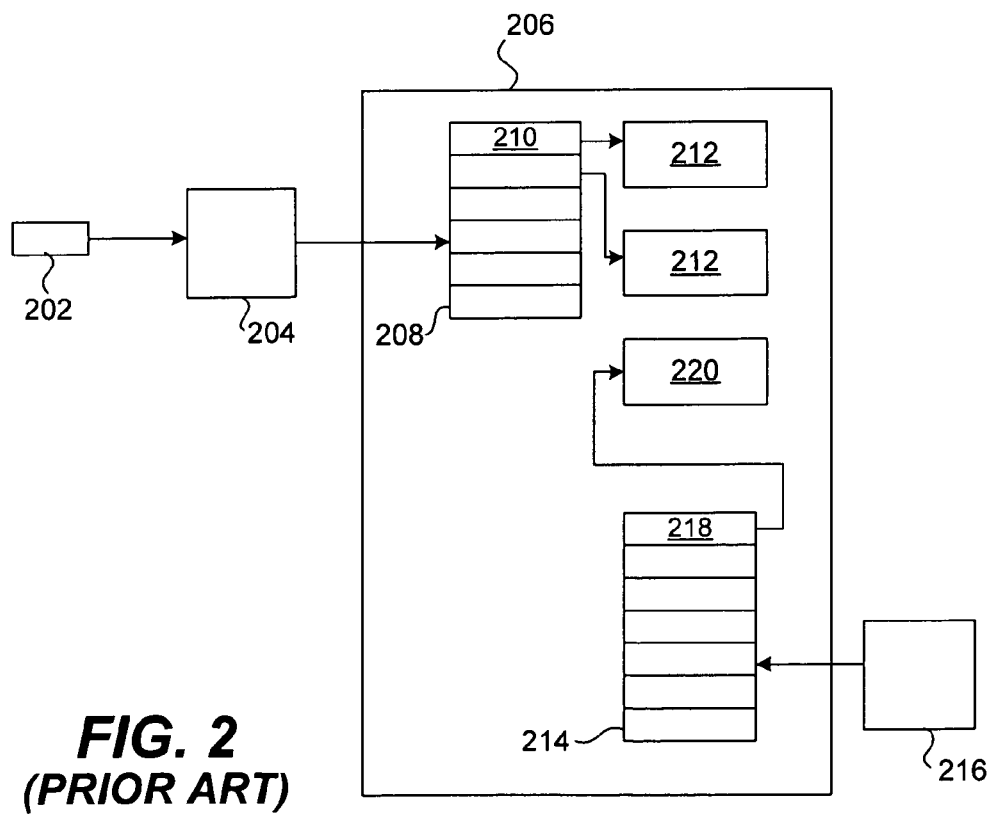
FIG. 2 is a block diagram illustrating a router having a conventional inbound and outbound controller.
Figure 3:
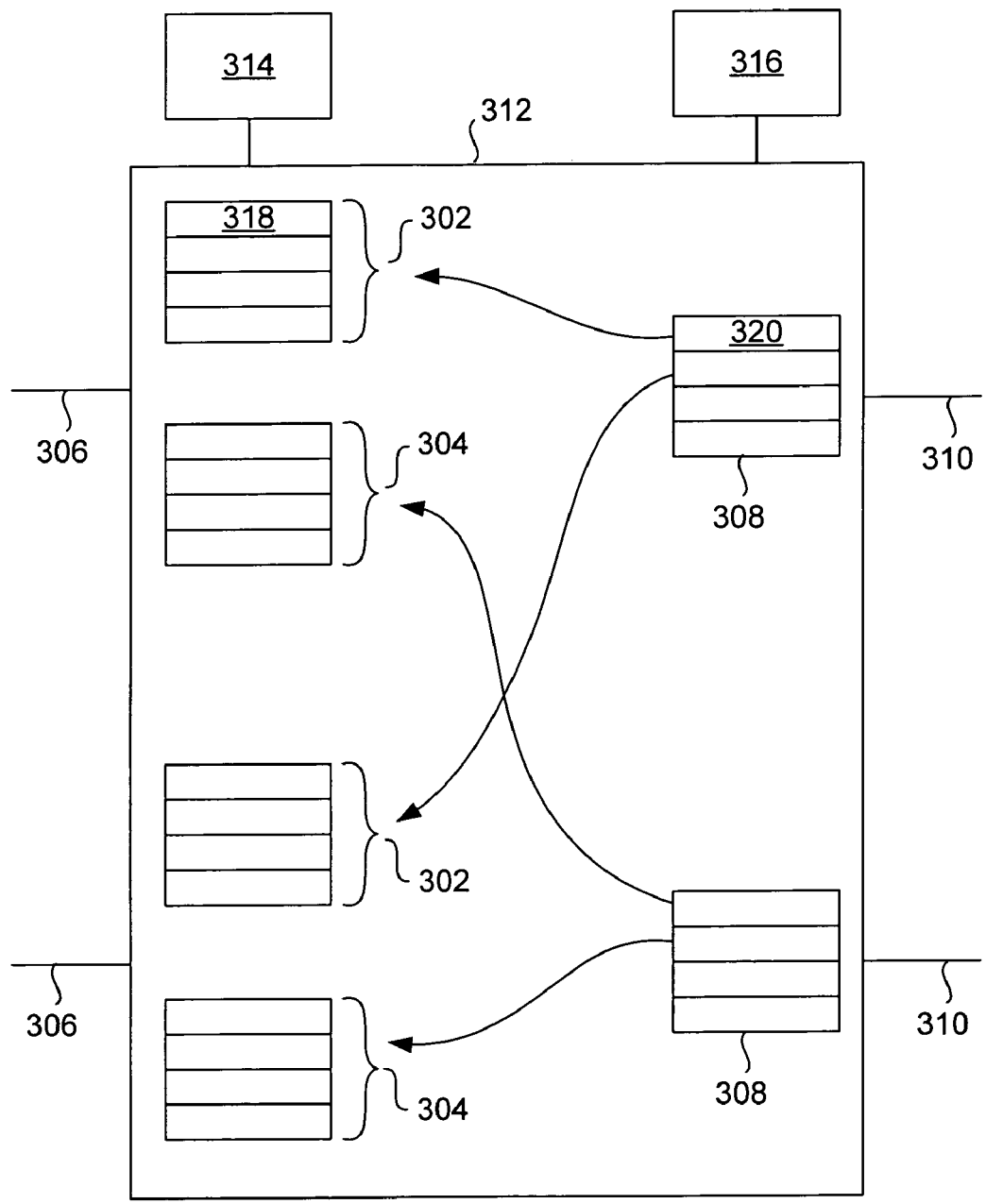
FIG. 3 is a block diagram illustrating a router according to one embodiment of the invention.

Referring now to FIG. 3, a block diagram of a router according to one embodiment of the invention is illustrated. As shown, a plurality of inbound queues 302, 304 are provided for each inbound port 306 and an outbound queue 308 is provided for each outbound port 310. The inbound 302, 304 and outbound 308 queues are stored in memory 312 such that the inbound queues 302, 304 are accessible to an inbound controller 314 and the outbound queues 308 are accessible to an outbound controller 316. The inbound queues 302, 304 are created such that they permit classification of inbound packets corresponding to packet sorting criteria. By way of example, the packet sorting criteria may include the source address of the inbound packet, the destination address of the inbound packet, the priority of the packet, and/or other criteria. Each inbound queue includes a plurality of queue entries 318, each of which correspond to a single packet. By way of example, each queue entry may include a packet descriptor and a pointer to a packet buffer that holds data for the packet. The packet descriptors may be pre-allocated while the packet buffers may be obtained from a free pool of available memory. In order to forward each packet, the CPU transfers each inbound queue 302, 304 to the outbound controller 316. The outbound controller 316 then stores the inbound queue in an entry 320 in the appropriate outbound queue 308. By way of example, the outbound controller 316 may have an internal pointer to each outbound queue 308. Thus, the outbound queue 308 includes a plurality of queue entries 320 corresponding to a set of inbound queues. By way of example, the outbound queue may include a first-in-first-out (FIFO) of inbound queue headers with pointers to the transferred inbound queues. Although one outbound queue 308 is shown for each outbound port 310, multiple outbound queues may be provided.

Figure 4:
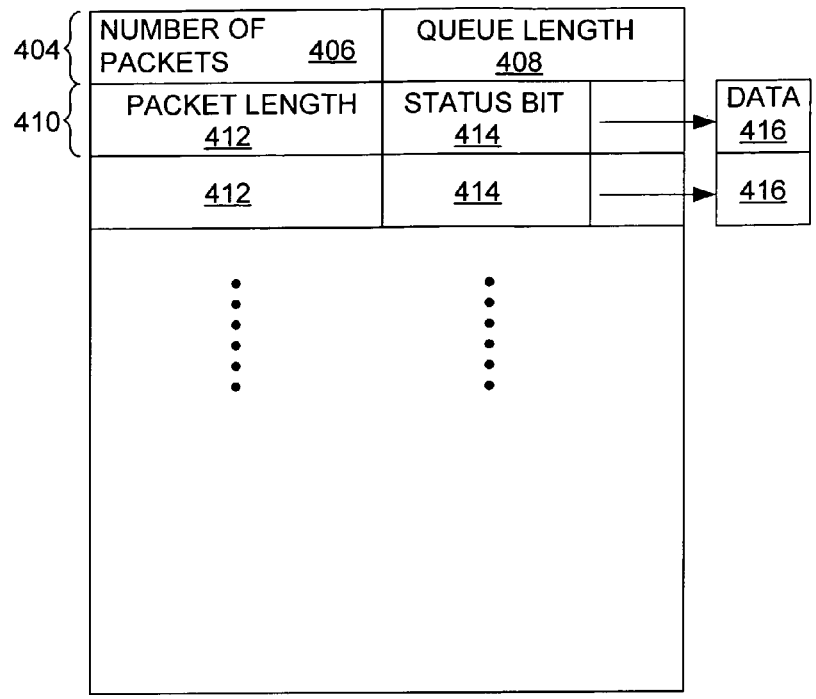
FIG. 4 is a block diagram illustrating an exemplary data structure that may be used for each inbound queue according to one embodiment of the invention.

Various data structures may be utilized in the implementation of the inbound and the outbound queues. One exemplary data structure that may be used for each inbound queue according to one embodiment of the invention is illustrated in FIG. 4. As shown, each queue 402 may contain a queue header 404 that includes a number of packets 406 in the queue and a queue length 408 (e.g., number of aggregate bytes in the queue). The queue header 404 may further include a maximum number of queue entries that may be stored in the queue, or amount of memory allocated for packet headers (not shown to simplify illustration). The information stored in the queue header 404 may be used by the inbound controller to determine when each inbound queue will be transferred to the outbound controller. By way of example, when an inbound queue reaches a specified number of packets or contains a specified number of bytes, the inbound queue may be transferred from the inbound controller to the outbound controller. Thus, this queue header 404 may be ignored by the outbound controller. Alternatively, the queue header 404 for an inbound queue may further include a queue ID corresponding to the appropriate outbound queue (not shown to simplify illustration). Each entry in the queue 402 may include a packet header 410, or descriptor, which includes a packet length 412 (e.g., number of bytes in the packet) as well as a status bit 414. A similar status bit may be implemented in the queue header 404 to indicate the status of an entire queue (not shown to simplify illustration). By way of example, the status bit 414 may indicate that a packet, or queue, is valid, invalid, or sent. Each queue entry may further include a pointer to packet data 416. The inbound and outbound queues may be implemented as linked lists, arrays or other data structures that may be utilized to store a set of packets.

Each inbound queue may be transferred to the outbound controller through the assertion of an interrupt. Once transferred, the inbound queue will be stored in the appropriate outbound queue by an outbound controller. Thus, each outbound queue may contain a set of pointers to the inbound queues received by the outbound controller.

Figure 5:
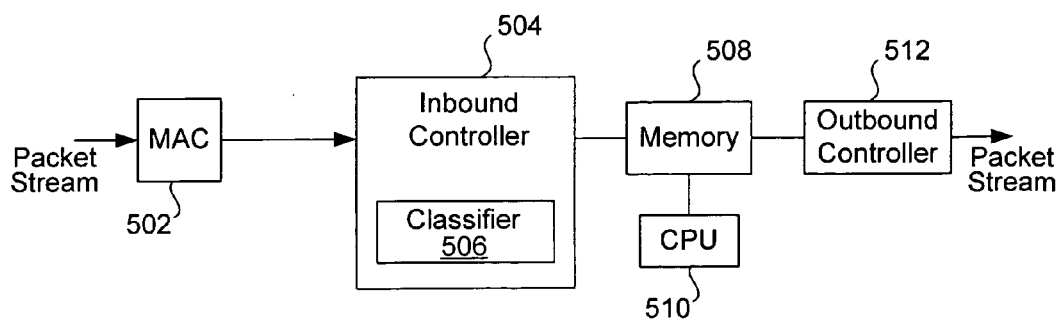
FIG. 5 is a block diagram illustrating a system including an inbound controller and an outbound controller according to one embodiment of the invention.

Various configurations in which the inbound and the outbound controller may be implemented are possible. By way of example, one inbound controller and one outbound controller may be provided for the entire router. Alternatively, as shown in FIG. 5, the present invention may include one inbound controller for each inbound port and one outbound controller for each outbound port. A packet stream may be received by a media access controller (MAC) 502 where the present invention is implemented in a broadcast network. In addition, an inbound controller 504 is shown to include a classifier 506 to permit classification of packets in an appropriate inbound queue. However, the classifier 506 may be implemented separately from the inbound controller 504. A memory 508 is provided for use by the inbound controller 504 and an outbound controller 512. In addition, a CPU 510 is provided which supervises the inbound controller 504 and the outbound controller 512. The memory 508 may store compatible representations of the inbound queues and the outbound queues, as well as pools of available memory, for use by the inbound controller 504 and the outbound controller 512. Thus, the outbound controller 512 may store each inbound queue received from the inbound controller in an entry in the appropriate outbound queue. The outbound controller 512 may then transmit packets stored in the outbound queue. Thus, a packet stream is provided to the corresponding outbound port.

Figure 6:
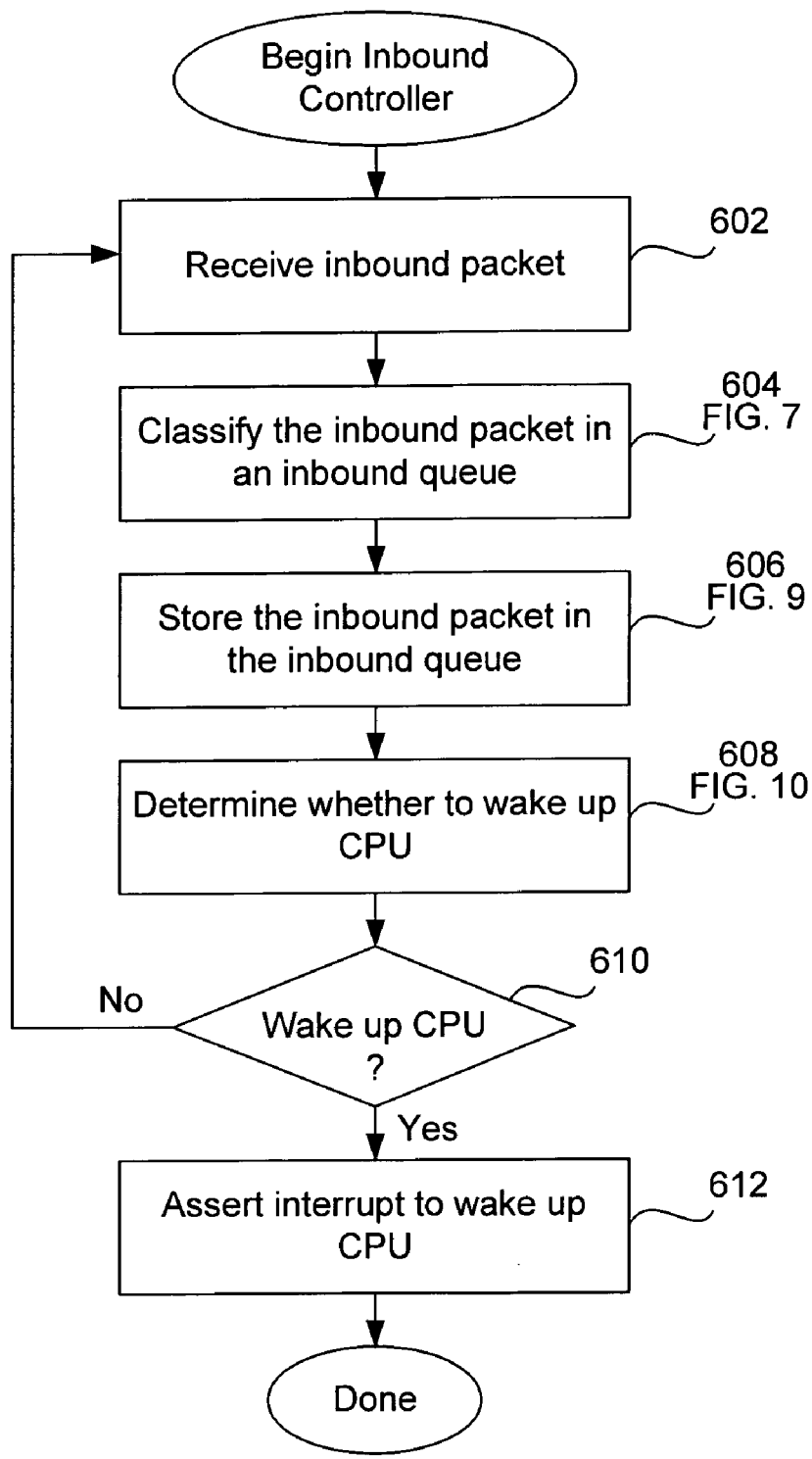
FIG. 6 is a flow diagram illustrating a method for implementing an inbound controller according to one embodiment of the present invention.

One method for implementing an inbound controller according to one embodiment of the present invention is illustrated in FIG. 6. As described above, a plurality of inbound queues are provided for one of the plurality of inbound ports. At step 602, an inbound packet is received at the one of the plurality of inbound ports. The inbound packet is then classified in a selected one of the plurality of inbound queues according to packet sorting criteria at step 604. By way of example, the inbound packet (e.g., packet header) may include a source address and a destination address. Thus, the packet sorting criteria may include the source address and the destination address of the inbound packet, as well as other sorting criteria. The inbound packet is then stored in the selected one of the plurality of inbound queues at step 606. In addition, the queue header may be updated to reflect the current number of packets and bytes stored within the inbound queue. Next, it is determined whether one of the plurality of inbound queues is ready to be moved to an outbound queue at step 608. By way of example, it is determined whether to wake up the CPU. Rather than wake up the CPU upon receiving each packet, the CPU is woken up at various intervals. If it is determined to wake up the CPU at step 610, an interrupt is asserted at step 612 to signal when one of the plurality of inbound queues is ready to be moved by the CPU to an outbound queue. If it is not determined to wake up the CPU at step 610, the inbound controller receives the next inbound packet at step 602. Although the inbound controller is described as being implemented for a single port, the inbound controller may be implemented for multiple ports or an entire router.

Figures 7, 8:
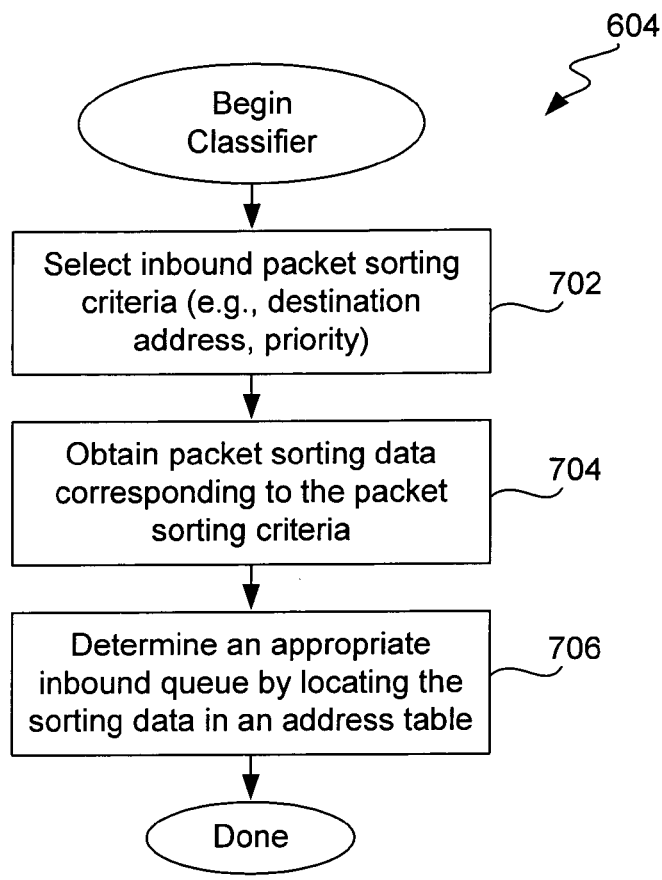
FIG. 7 is a flow diagram illustrating the method for classifying inbound packets of FIG. 6 according to one embodiment of the present invention.
FIG. 8 is a diagram illustrating an exemplary address table that may be used to classify each packet according to one embodiment of the invention.

In order to transfer each inbound queue to the appropriate outbound queue, each packet must be classified in the appropriate inbound queue. FIG. 7 is a flow diagram illustrating the method for classifying inbound packets 604 of FIG. 6 according to one embodiment of the present invention. Each inbound packet may be sorted according to various sorting criteria. At step 702, inbound packet sorting criteria are selected to permit each inbound packet to be classified in one of the inbound queues. The packet sorting criteria may include the source address of the inbound packet, the destination address of the inbound packet, the priority of the packet (e.g., session ID), the IP address of the packet, and/or other criteria such as information which may be obtained from the packet. Next, at step 704, packet sorting data associated with the packet sorting criteria is obtained for the inbound packet being sorted. By way of example, the destination address of the inbound packet may be obtained. Next, at step 706, the inbound packet is sorted into one of the inbound queues according to the packet sorting data. By way of example, an address table including each inbound queue may be provided that includes the packet sorting data associated with each queue. Thus, the inbound packet may be classified upon locating the relevant packet sorting data in the address table. By way of example, a classified inbound packet may be associated with an inbound queue through storing a queue ID of the inbound queue in the inbound packet (e.g., packet header). While classification of packets may be performed for various purposes, such classification is typically performed in software. Accordingly, in one embodiment of the invention, the classifier is implemented in hardware to maximize the packet per second forwarding rate.

As described above, one method for classification of inbound packets is through the use of one or more address tables. FIG. 8 is a diagram illustrating an exemplary address table that may be used to classify each packet according to one embodiment of the invention. A separate classifier and address table may be provided for each port. In addition, software may be provided which allows the CPU to create the address tables required by each classifier.

An exemplary address table 802 may include a destination address 804 or outbound port number of the packet, a priority 806 of the packet, and a queue ID 808 corresponding to an inbound queue. The inbound queue classification will further correspond to an outbound queue. By way of example, the queue ID of the corresponding outbound queue may be stored in the queue header of each inbound queue. Thus, the outbound queue may be implicit in the inbound queue in which each packet is classified. As described above, packet classification may be accomplished through the use of a different address table for each port, as shown. Alternatively, a single global address table may be used.

In order to optimize the use of available memory, a free pool of available memory buffers may be maintained rather than pre-allocating memory. By way of example, this free pool may be implemented through the use of a linked list, array, or other data structure compatible with the inbound queues and the outbound queues. Moreover, multiple free pools may be utilized to recycle available packet buffers, packet descriptors, or queue descriptors.

Figure 9:
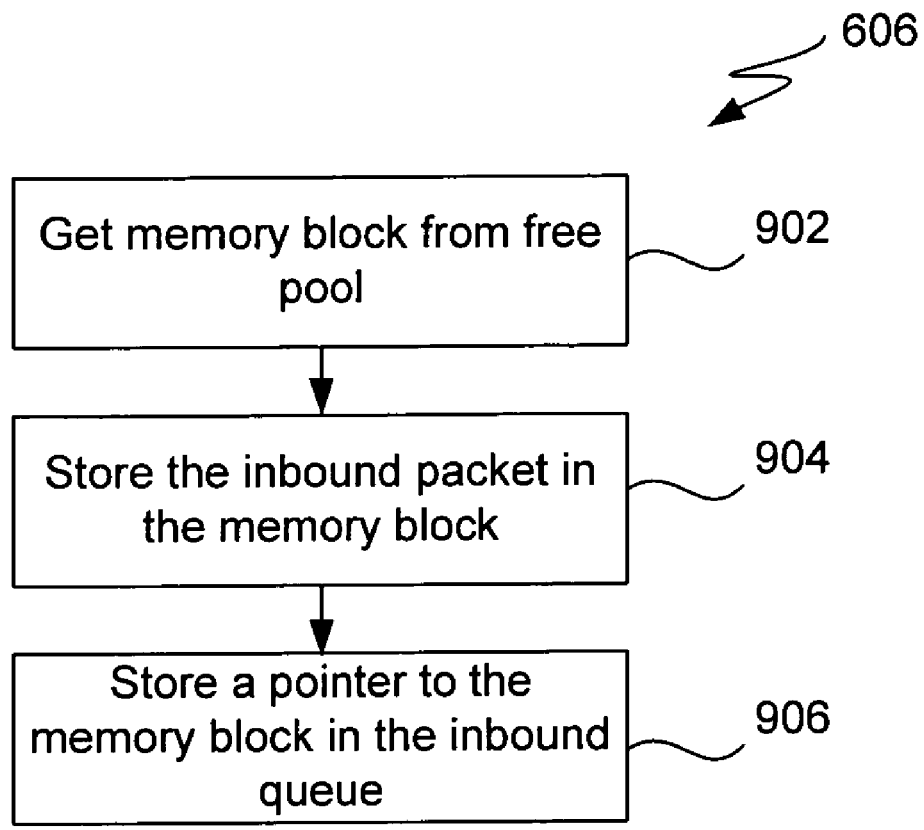
FIG. 9 is a flow diagram illustrating the method of storing an inbound packet in an inbound queue of FIG. 6 according to one embodiment of the invention.

Prior to storing each classified packet in the appropriate inbound queue, memory may be allocated from one or more free pools of available memory. FIG. 9 is a flow diagram illustrating the method of storing an inbound packet in an inbound queue 606 of FIG. 6 according to one embodiment of the invention. At step 902, an available packet buffer may be obtained from a free pool of available packet buffers. Thus, memory may be obtained to permit storage of the inbound packet. The inbound packet is then stored in the available packet buffer at step 904. The packet buffer containing the inbound packet is then stored in the inbound queue at step 906. By way of example, a pointer to the packet buffer containing the inbound packet may be stored in the inbound queue.

Figure 10:
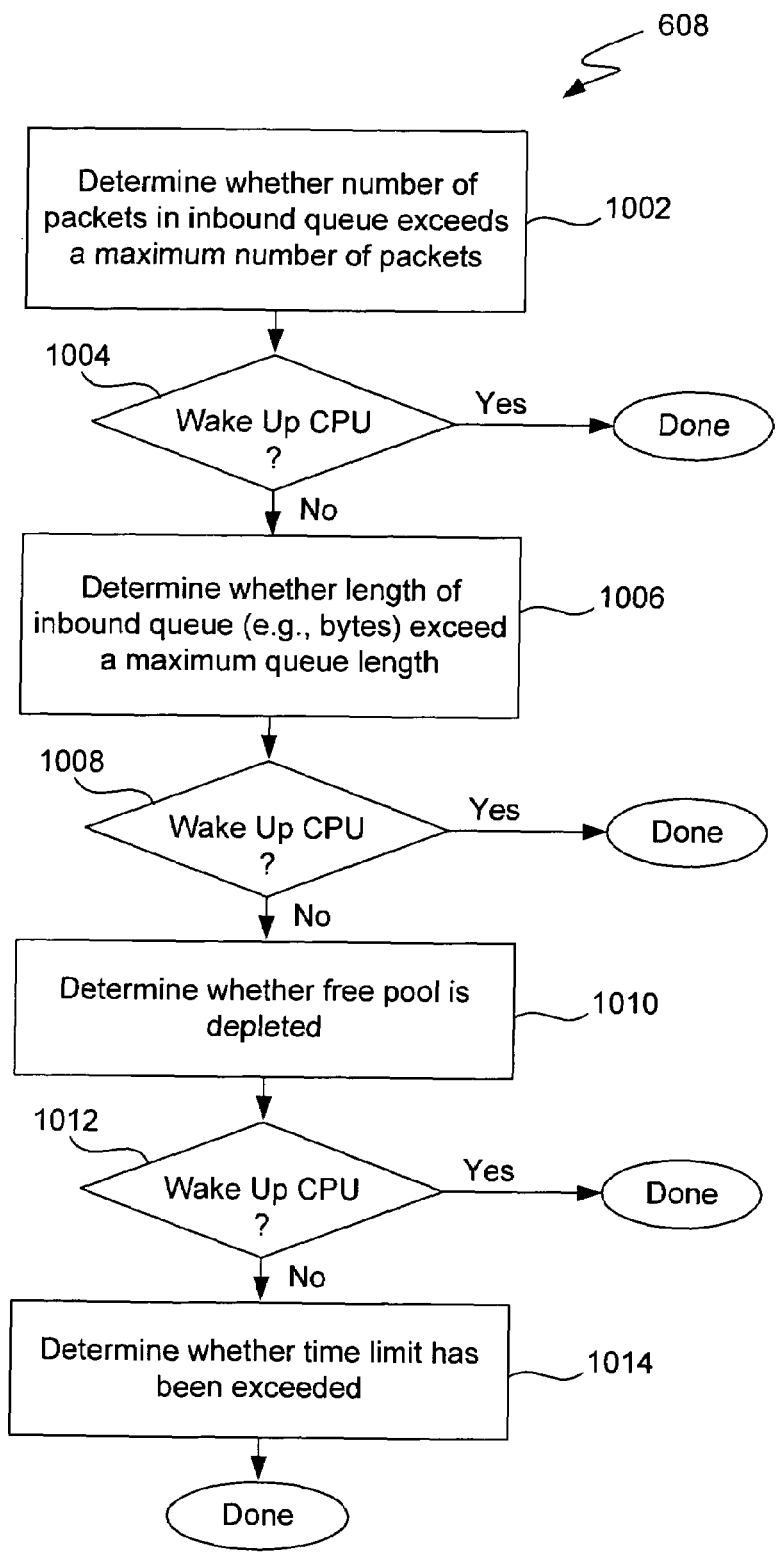
FIG. 10 is a flow diagram illustrating the method of determining whether one of the plurality of inbound queues is ready to be moved to an outbound queue, shown in FIG. 6, according to one embodiment of the invention.

Rather than wake up the CPU upon receiving each packet, the CPU is woken up at various intervals. FIG. 10 illustrates the method of determining whether to wake up the CPU 608 of FIG. 6 according to one embodiment of the invention. At step 1002, it is determined whether the number of packets in any one of the inbound queues exceeds a maximum number of packets. By way of example, a maximum number of packets may be specified for each inbound queue. As yet another example, a single global maximum number of packets may be specified for the inbound queues. If the maximum number of packets is exceeded, it has been determined to wake up the CPU at step 1004. However, if the maximum number of packets has not been exceeded, it is next determined whether the length of any one of the inbound queues (e.g., number of aggregate bytes within the queue) exceeds a maximum queue length at step 1006. If the maximum queue length is exceeded, it has been determined to wake up the CPU at step 1008. However, if the maximum queue length has not been exceeded, it is next determined whether the free pool of memory has been depleted at step 1010. By way of example, a desired minimum amount of available memory may be specified to indicate depletion of one or more free pools of memory. If the free pool has been depleted, it has been determined to wake up the CPU at step 1012. However, if the free pool has not been depleted, it is next determined whether a maximum time limit (e.g., 0.5 milliseconds) has been exceeded at step 1014. In instances where network traffic is slow, inbound queues will fill slowly and a large portion of the free pool may remain available. Therefore, the maximum time limit sets a minimum forwarding rate in instances where inbound traffic is at a minimum. The above determinations may be made separately or in combination to determine whether to wake up the CPU through the assertion of an interrupt. Moreover, these determinations are exemplary, and therefore further determinations may be made.

Figure 11:
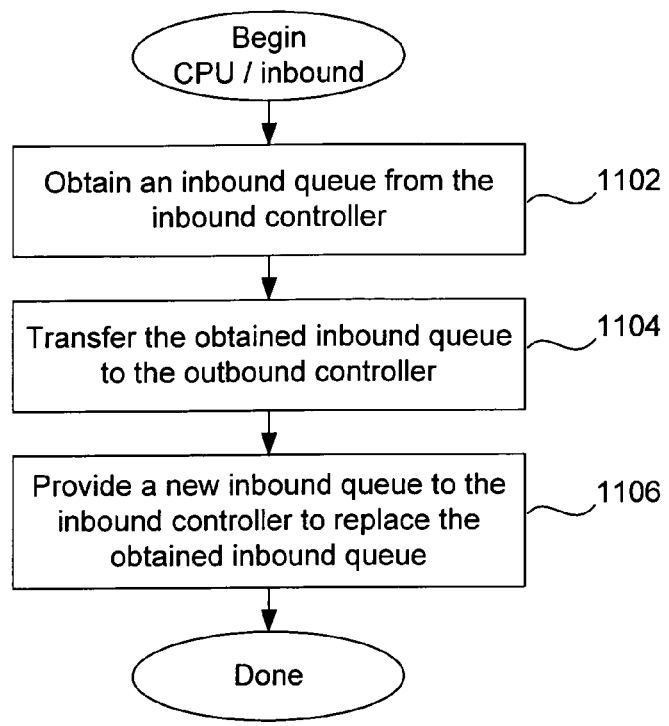
FIG. 11 is a flow diagram illustrating one method for operation of the CPU in response to the inbound controller according to one embodiment of the invention.

Upon the assertion of an interrupt, the CPU may transfer an inbound queue to an outbound controller or outbound queue associated with an outbound port. FIG. 11 illustrates one method for operation of the CPU in response to the inbound controller according to one embodiment of the invention. At step 1102, an inbound queue may be obtained from the inbound controller. The obtained inbound queue may then transferred to the outbound controller at step 1104. A new inbound queue may then be provided to the inbound controller as a replacement for the obtained inbound queue at step 1106. This new inbound queue may be obtained from the outbound controller, as will be further described below, or may be obtained from a free pool of available memory. Moreover, the CPU may not need to act to provide this replacement queue when inbound and outbound traffic are balanced, since a new queue will automatically be made available as packets are forwarded through each port. In this manner, the CPU transfers a queue of packets from the inbound controller to the outbound controller.

Figure 12:
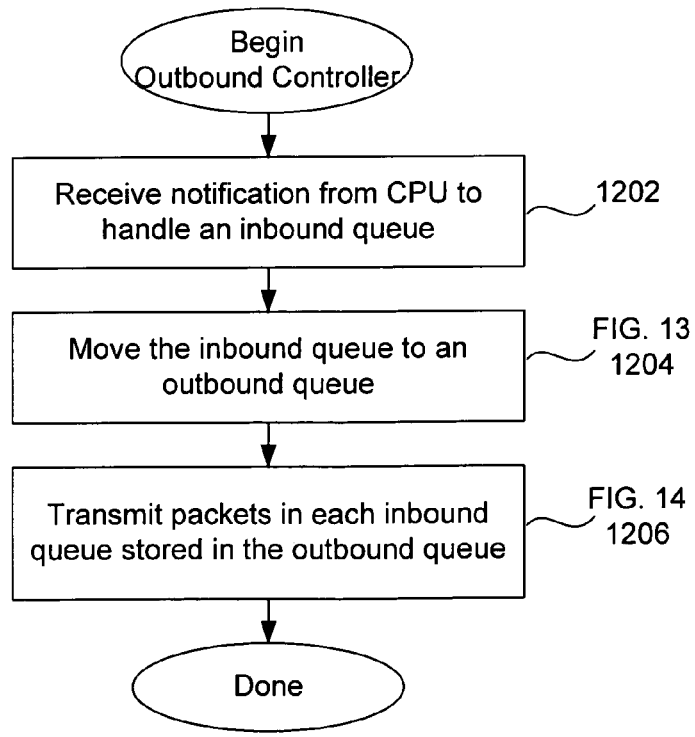
FIG. 12 is a flow diagram illustrating a method for implementing an outbound controller according to one embodiment of the invention

The outbound controller stores each received inbound queue in an outbound queue and selectively transmits packets stored in the outbound queue. FIG. 12 is a flow diagram illustrating one method for implementing an outbound controller according to one embodiment of the invention. A notification may be received from the CPU to handle an inbound queue at step 1202. As described above, the outbound controller may be implemented for one of the plurality of outbound ports. Moreover, an outbound queue associated with the one of the plurality of outbound ports is provided. The outbound queue is configured such that it is capable of storing a plurality of inbound queues. By way of example, the outbound queue may include a plurality of entries capable of storing pointers to each one of the plurality of inbound queues. The inbound queue is then transferred to the outbound queue at step 1204. Packets stored in each inbound queue of the outbound queue may then be transmitted at step 1206. Although the outbound controller is described as providing one outbound queue for a single port, multiple outbound queues may be provided. Moreover, although described as being implemented for a single port, the outbound controller may be implemented for multiple ports or an entire router.

Figure 13:
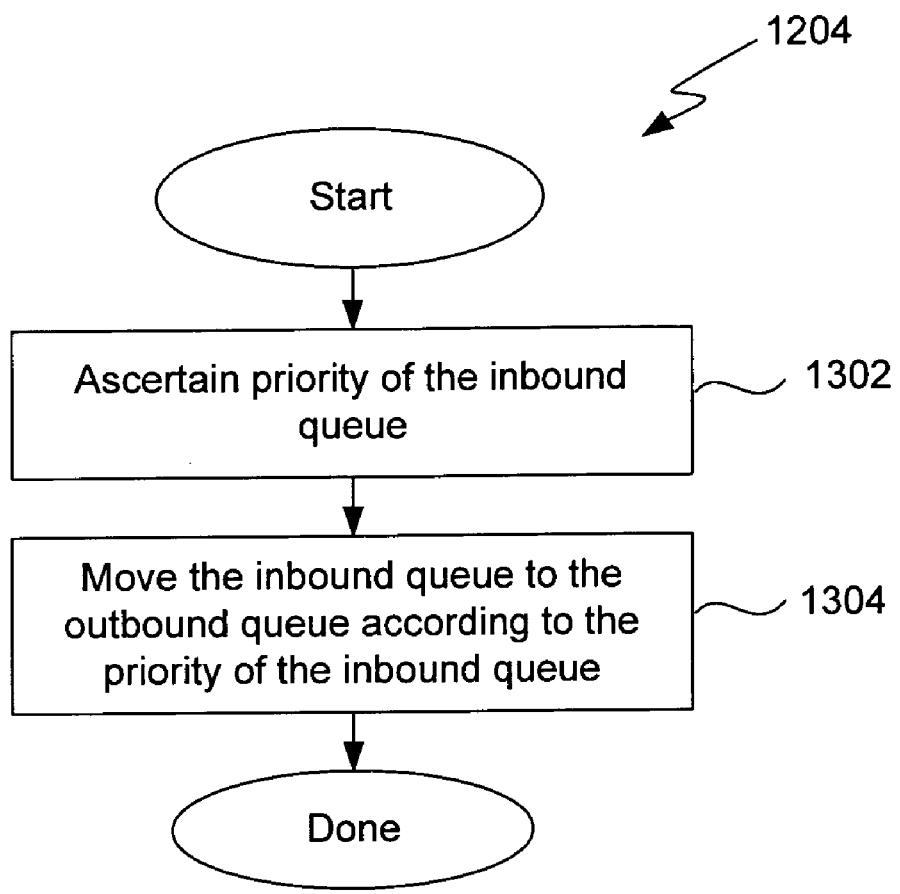
FIG. 13 is a flow diagram illustrating the method for transferring the inbound queue to an outbound queue, shown in FIG. 12, according to one embodiment of the invention.

When an inbound queue is received by the outbound controller, the outbound controller transfers the inbound queue to an outbound queue. FIG. 13 is a flow diagram illustrating the method for transferring the inbound queue to an outbound queue 1204 of FIG. 12 according to one embodiment of the invention. Since one outbound queue may be provided for each outbound port and associated outbound controller, each inbound queue may be stored in the outbound queue according to a priority order. Thus, a priority of the inbound queue may be ascertained at step 1302. By way of example, a priority of the inbound queue may be provided in the queue header for the inbound queue. As yet another example, the priority of the inbound queue may be provided in the corresponding address table. The inbound queue may then be transferred to the outbound queue according to the priority of the inbound queue at step 1304. Moreover, since multiple outbound queues may be provided, the appropriate outbound queue may be determined from an address table such as that illustrated in FIG. 8.

Figure 14:
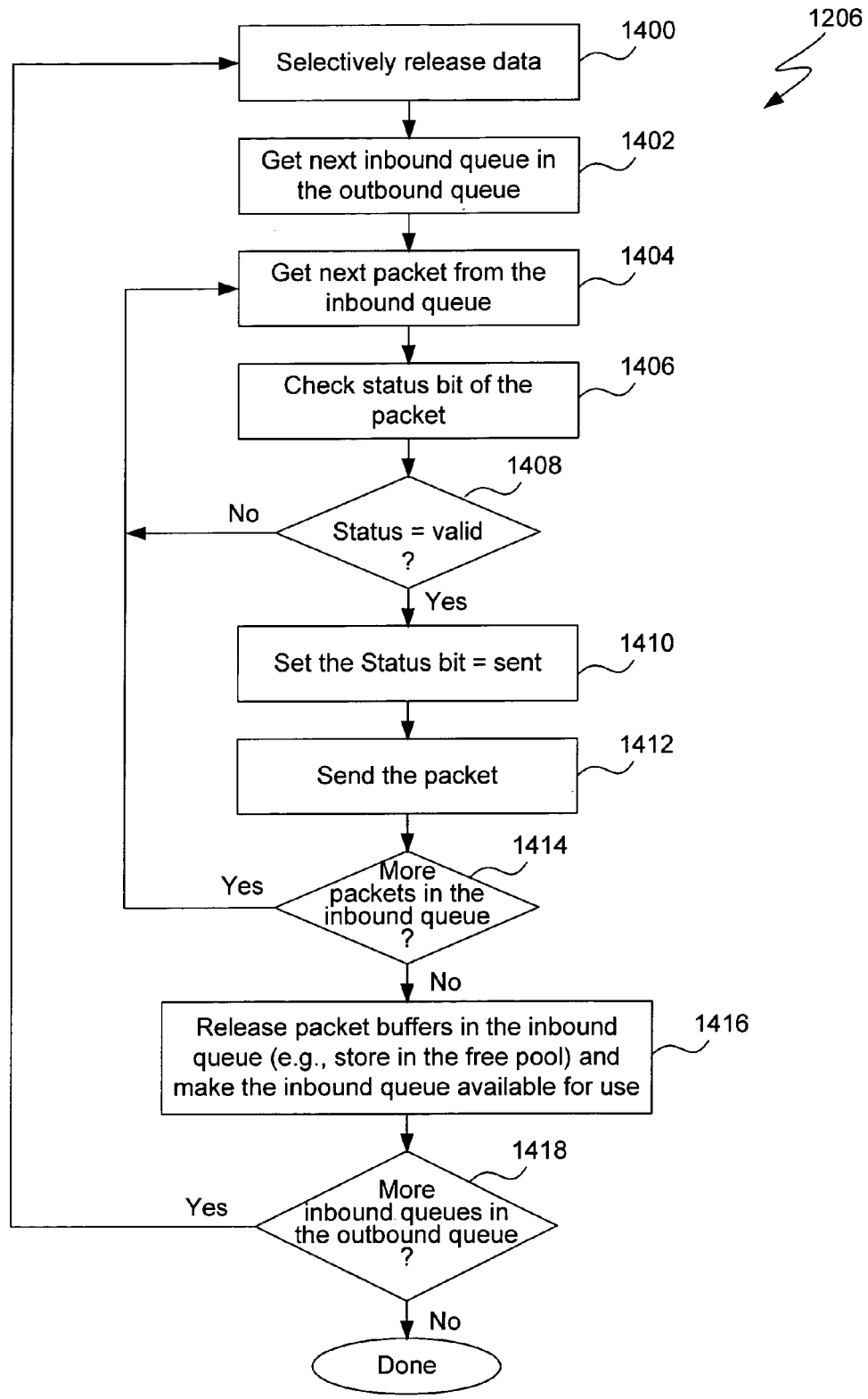
FIG. 14 is a flow diagram illustrating the method for transmitting packets of FIG. 12 according to one embodiment of the invention.

The outbound controller may selectively transmit packets as well as deallocate memory previously used by the transmitted packets. FIG. 14 is a flow diagram illustrating the method for transmitting packets 1206 of FIG. 12 according to one embodiment of the invention. Since the inbound queues may be stored in the outbound queue according to the priority of the inbound queues, the packets in each inbound queue may be transmitted consecutively. Prior to transmitting these packets or during transmission, data may be selectively released at step 1400. The packet buffers associated with this data may similarly be released and made available for use (e.g., returned to a free pool of buffers). By way of example, selected packets or an entire inbound queue may be tagged as sent or invalid to maximize the throughput of the router. This technique may be utilized to accommodate for a high level of traffic where the number of packets being sent is excessive. Moreover, where there is an unacceptable delay during packet transmission (e.g., voice transmission), these packets or queues of packets may be beneficially discarded. Similarly, this technique may be beneficial where the amount of free memory available for use by the inbound and/or the outbound controller is diminishing. Thus, the outbound controller may selectively transmit packets based upon the priority of the packets. By way of example, packets may be prioritized in a plurality of queues, each of the plurality of queues having a different priority.

Packets may be transmitted for each inbound queue in the outbound queue. Thus, a next inbound queue in the outbound queue may be obtained at step 1402. A next packet from the obtained inbound queue may then be obtained at step 1404. A status bit of the packet may then be checked at step 1406. If the status bit indicates that the packet is valid at step 1408, the status bit may be set to sent or invalid at step 1410. The packet may then be sent at step 1412. However, if the status bit of the packet indicates that the packet is invalid, a next packet may be obtained at step 1404.

After the packet is sent, it is determined whether there are more packets in the inbound queue at step 1414. If there are more packets, a next packet may be obtained from the inbound queue at step 1404. However, if there are no packets remaining in the inbound queue, memory (e.g., packet buffers) in the inbound queue may be released at step 1416. By way of example, the entire inbound queue may be released. Alternatively, all invalid and/or sent packet buffers may be released. The empty inbound queue may therefore be made available for use at step 1416. By way of example, the released packet buffers may be stored in a free pool of available packet buffers. Moreover, the empty inbound queue may be used as a new inbound queue by the inbound controller. As yet another example, the empty inbound queue may be used by the outbound controller during bi-directional (e.g., full duplex) operation. In addition, this newly available inbound queue may be stored in a separate entity having a data structure (e.g., linked list) compatible with the free pool of available memory, as well as the inbound and outbound queues. The CPU may therefore reuse the memory for each inbound queue rather than recovering each available packet buffer individually. Since memory may be reused by the inbound controller and the outbound controller, the CPU may dedicate a majority of the transfer operations performed to the transmission of packets rather than the transfer of free buffers. Each inbound queue that remains in the outbound queue may then be processed at step 1418.

Figure 15:
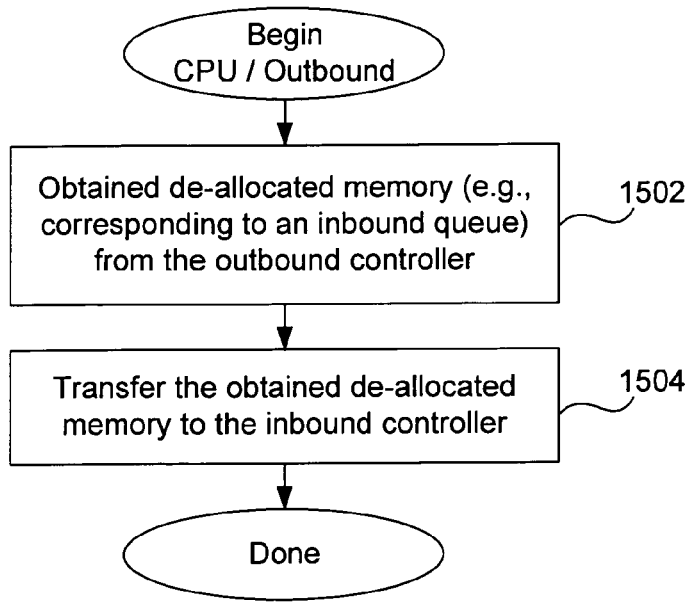
FIG. 15 is a flow diagram illustrating one method for operation of the CPU in response to the outbound controller according to one embodiment of the invention.

FIG. 15 is a flow diagram illustrating one method for operation of the CPU in response to the outbound controller according to one embodiment. When the router of the present invention is not operating in bi-directional (e.g., full duplex) mode, the de-allocated memory may be made available to the inbound controller. Thus, de-allocated memory corresponding to a previously transmitted inbound queue may be obtained from the outbound controller at step 1502. The obtained de-allocated memory may then be transferred to the inbound controller at step 1504. This transfer may be accomplished through transferring the de-allocated memory to an inbound queue. Alternatively, the de-allocated memory may be transferred to a free pool of available memory that is accessible to the inbound controller.

Figure 16:
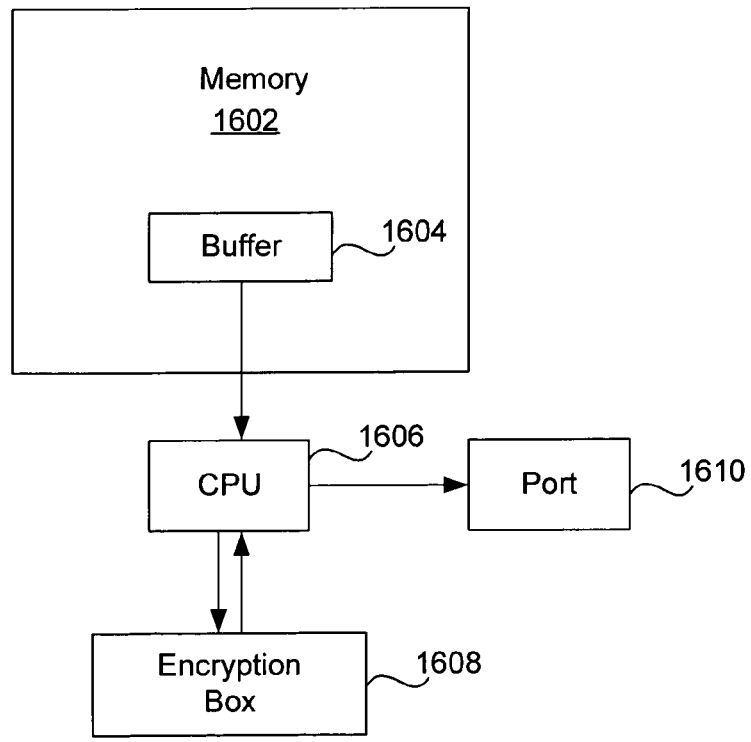
FIG. 16 is a block diagram illustrating a conventional encryption system.

The present invention may be implemented in various applications. One such application is the encryption of packets. FIG. 16 is a block diagram illustrating a conventional encryption system. As shown, a memory 1602 is provided in which one or more packet buffers 1604 may be stored. A CPU 1606 obtains a packet from the packet buffer 1604 and forwards the packet a first time to an encryption box 1608. The encryption box 1608 encrypts the packet. The CPU then receives the encrypted packet from the encryption box 1608 and forwards the packet a second time to the appropriate outbound port 1610. Thus, during the conventional encryption process, each packet is effectively forwarded twice. Accordingly, the packet per second forwarding rate is one half of that without encryption and therefore the conventional system is costly to operate.

Figure 17:
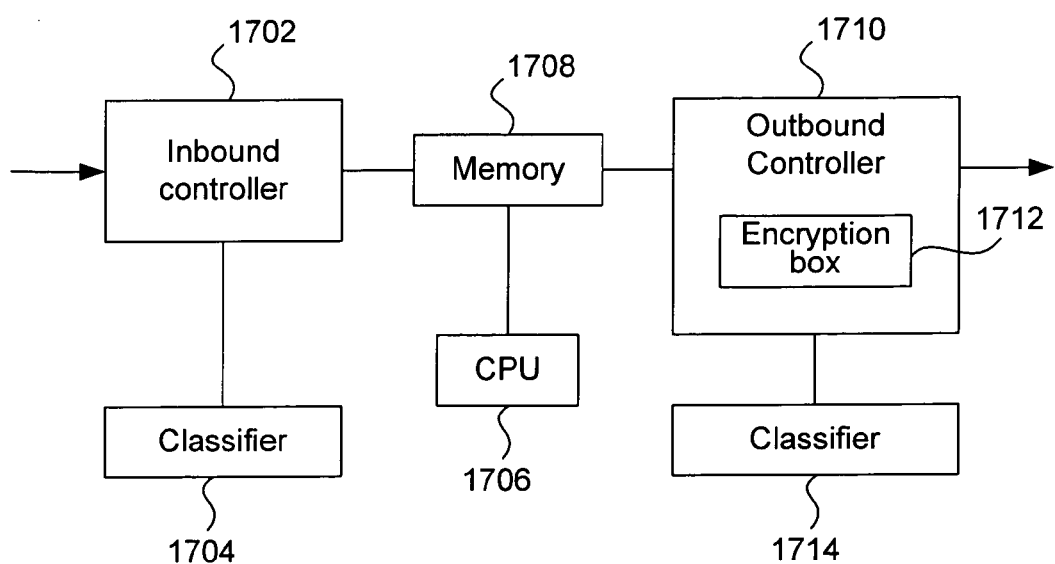
FIG. 17 is a block diagram illustrating an encryption system according to one embodiment of the invention.

FIG. 17 is a block diagram illustrating an encryption system according to one embodiment of the invention. As described above, a separate inbound controller may be provided for each inbound port and a separate outbound controller may be provided for each outbound port. As shown, an inbound controller 1702 is provided for an inbound port. As packets are received by the inbound controller 1702, they may be classified and stored in the appropriate inbound queue by inbound classifier 1704. CPU 1706 may then transfer entire inbound queues stored in memory 1708 to outbound controller 1710 which is coupled to encryption box 1712. Thus, the encryption box 1712 may encrypt each queue rather than separate packets. The encryption box 1712 may then store each encrypted queue in the corresponding inbound queue or compatible data structure. Since the packets have been classified in appropriate inbound queues, encryption keys may therefore be distinguished. Since encryption may vary according to source address, destination address, and other factors, the outbound controller 1712 may classify each inbound queue in multiple outbound queues. In this manner, each receiving service may ascertain the status of encryption of each queue. The outbound controller 1712 may classify each inbound queue in the appropriate outbound queue through the use of a separate outbound classifier 1714. Thus, a separate classifier may be provided for each controller or port. Alternatively, the outbound queue classification may be made implicit through storing an outbound queue ID in the inbound queue header by the inbound classifier 1704. Accordingly, since encryption is performed for each queue rather than on a per packet basis, CPU overhead is reduced. In addition to being implemented in encryption systems, the present invention may be used in various systems such as data compression and decompression systems.

The present invention reduces CPU overhead in the forwarding process. This is accomplished through transferring sets of packets, or queues of packets, between an inbound controller and an outbound controller. Thus, one transfer operation may be performed for a set of packets rather than a set of operations for one packet. Moreover, operations utilized to de-allocate packets may be similarly reduced. Accordingly, CPU overhead is reduced, increasing the packet per second forwarding rate.

In addition to reducing CPU overhead, memory utilization is minimized through the allocation of packet buffers by the inbound controller. Since the packet buffers are de-allocated upon transmission, memory is efficiently utilized. As a result, the amount of memory required and production costs associated with each router are minimized.

Through combining software and hardware modules, the present invention provides efficient and accurate packet forwarding. Hardware is efficient, but typically does not provide global knowledge. Thus hardware may be utilized to provide speed where global knowledge is not required. By way of example, a hardware classifier may provide an increased forwarding rate. At the same time, software provides global knowledge and intelligence in forwarding decisions to increase the efficiency of the forwarding process. By way of example, where a particular outbound port is congested, a queue may be discarded by the CPU.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as utilizing a single outbound queue for each outbound port. However, it should be understood that the present invention is not limited to this arrangement, but instead would equally apply regardless of the number of outbound queues provided per port. Also, the invention is described as providing a single inbound controller for each inbound port. Similarly, the invention is described as providing a single outbound controller for each outbound port. This is not a requirement of the present invention and therefore, other arrangements for the inbound and outbound controllers would still fall within the scope of the invention. Accordingly, the present embodiments are to be considered as illustrative and not restrictive, and the invention is not to be limited to the details given herein, but may be modified within the scope and equivalents of the appended claims.

What is claimed is:

1. A method for providing an inbound controller for a router, the router having an inbound port and an outbound port, a memory, and a CPU, the inbound controller being adapted for receiving an inbound packet at the inbound port, the method comprising:
   providing a plurality of inbound queues for the inbound port;
   receiving an inbound packet at the inbound port;
   classifying the inbound packet in a selected one of the plurality of inbound queues according to packet sorting criteria;
   storing the inbound packet in the selected one of the plurality of inbound queues; and
   determining when one of the plurality of inbound queues storing a plurality of packets is ready to be moved to an entry in an outbound queue associated with the outbound port, the outbound queue being capable of storing a reference to a multiplicity of inbound queues such that a reference to each of the multiplicity of inbound queues is separately stored in a different one of a plurality of entries in the outbound queue, each of the multiplicity of inbound queues storing a plurality of packets to be separately transmitted.

2. The method as recited in claim 1, further including:
   asserting an interrupt when it is determined that one of the plurality of inbound queues is ready to be moved to an outbound queue.

3. The method as recited in claim 2, further comprising:
   when the interrupt is asserted, transferring the one of the plurality of inbound queues to an entry in the outbound queue or an outbound controller associated with the outbound queue.

4. The method as recited in claim 3, wherein transferring the one of the plurality of inbound queues to an entry in the outbound queue or an outbound controller associated with the outbound queue is performed by the CPU.

5. The method as recited in claim 3, wherein transferring the one of the plurality of inbound queues to an entry in the outbound queue or an outbound controller associated with the outbound queue comprises:
   transferring a reference to the one of the plurality of inbound queues to an entry in an outbound queue corresponding to a priority associated with the one of the plurality of inbound queues.

6. The method as recited in claim 3, wherein transferring the one of the plurality of inbound queues to the outbound queue or an outbound controller associated with the outbound queue comprises:
   transferring a pointer to the one of the plurality of inbound queues to an entry in an outbound queue associated with the one of the plurality of inbound queues.

7. The method as recited in claim 1, wherein classifying the inbound packet includes:
selecting inbound packet sorting criteria;
obtaining packet sorting data for the inbound packet, the packet sorting data being associated with the packet sorting criteria; and
sorting the inbound packet into one of the plurality of inbound queues according to the packet sorting data.

8. The method as recited in claim 1, the selected one of the plurality of inbound queues corresponding to one of a plurality of outbound queues, the method further comprising:
transferring the selected one of the plurality of inbound queues storing a plurality of packets to the outbound queue associated with the outbound port such that a reference to the selected inbound queue storing a plurality of packets is stored in a single one of a plurality of entries in the outbound queue.

9. The method as recited in claim 1, wherein storing the inbound packet includes:
obtaining an available packet buffer from a free pool of available packet buffers;
placing the inbound packet in the packet buffer; and
storing the packet buffer in the inbound queue.

10. The method as recited in claim 1, wherein determining when one of the plurality of inbound queues is ready to be moved to an outbound queue includes:
determining whether a number of packets in one of the plurality of inbound queues exceeds a maximum number of packets.

11. The method as recited in claim 1, wherein determining when one of the plurality of inbound queues is ready to be moved to an outbound queue includes:
determining whether a number of bytes in one of the plurality of inbound queues exceeds a maximum number of bytes.

12. The method as recited in claim 1, wherein determining when one of the plurality of inbound queues is ready to be moved to an outbound queue further includes:
determining whether a free pool of available memory has been depleted.

13. The method as recited in claim 1, wherein determining when one of the plurality of inbound queues is ready to be moved to an outbound queue further includes:
determining whether a maximum time limit has been exceeded.

14. The method as recited in claim 1, wherein the outbound queue comprises a plurality of entries, each of the plurality of entries storing or identifying one of the multiplicity of inbound queues.

15. A method for providing an outbound controller for a router, the router having an inbound port and an outbound port, a memory, and a CPU, the outbound controller being adapted for forwarding packets at the outbound port, the method comprising:
providing an outbound queue associated with the outbound port and being capable of storing a plurality of inbound queues;
receiving a notification to handle an inbound queue, the inbound queue storing a plurality of packets that are to be separately transmitted;
transferring the inbound queue storing a plurality of packets to a single entry in the outbound queue associated with the outbound port such that a reference to the inbound queue storing a plurality of packets is stored in one of a plurality of entries in the outbound queue; and
repeating the receiving and transferring steps for the plurality of inbound queues such that a reference to each of the plurality of inbound queues is separately stored in a different one of the plurality of entries in the outbound queue.

16. The method as recited in claim 15, wherein receiving the notification includes:
receiving a notification from the CPU to handle the inbound queue.

17. The method as recited in claim 15, further including:
transmitting packets stored in the outbound queue.

18. The method as recited in claim 15, wherein transmitting packets includes:
selectively discarding packets stored in the outbound queue.

19. The method as recited in claim 15, wherein transmitting packets stored in the outbound queue further includes:
obtaining a next one of the plurality of inbound queues stored in the outbound queue;
transmitting selected packets stored in the next one of the plurality of inbound queues; and
releasing memory associated with the next one of the plurality of inbound queues.

20. The method as recited in claim 19, wherein releasing the memory includes:
storing the released memory in a free pool of available packet buffers.

21. The method as recited in claim 19, wherein releasing the memory includes:
forming a new inbound queue to be used by an inbound controller.

22. The method as recited in claim 19, wherein releasing the memory includes:
forming a queue to be used by the outbound controller during bi-directional operation.

23. The method as recited in claim 15, wherein transferring the inbound queue to the outbound queue further includes:
ascertaining a priority of the inbound queue; and
transferring the inbound queue to a single entry in the outbound queue according to the priority of the inbound queue.

24. The method as recited in claim 15, wherein transferring the inbound queue to a single entry in the outbound queue is performed by the CPU in response to an interrupt.

25. A method for forwarding a packet in a router, the router having a plurality of inbound ports and a plurality of outbound ports, a memory, and a CPU, the method comprising:
providing a plurality of inbound queues for one of the plurality of inbound ports;
providing a plurality of outbound queues, each one of the plurality of outbound queues corresponding to one of the plurality of outbound ports and being capable of storing a plurality of inbound queues;
receiving an inbound packet at the one of the plurality of inbound ports;
classifying the inbound packet in a selected one of the plurality of inbound queues according to packet sorting criteria;
storing the inbound packet in the selected one of the plurality of inbound queues;
repeating the steps of receiving, classifying, and storing until an interrupt is asserted; and
transferring one of the plurality of inbound queues storing a plurality of packets to one of the plurality of outbound queues corresponding to the packet sorting criteria when the interrupt is asserted such that a reference to the one of the plurality of inbound queues storing a plurality of packets is stored in a single one of a plurality of entries in the one of the plurality of outbound queues, wherein each of the plurality of packets in the one of the plurality of inbound queues is to be separately transmitted.

26. An inbound controller for a router, the router having an inbound port and an outbound port, a memory, and a CPU, the inbound controller being adapted for receiving an inbound packet at the inbound port, comprising:
 a packet receiving module coupled to the inbound port, the packet receiving module being adapted for receiving an inbound packet;
 wherein the memory has stored therein:
  a plurality of inbound queues for the inbound port;
  a classifier adapted for classifying the inbound packet in a selected one of the plurality of inbound queues according to packet sorting criteria;
  a packet storing module coupled to the classifier, the packet storing module being adapted for storing the inbound packet in the selected one of the plurality of inbound queues; and
  a module adapted for determining when one of the plurality of inbound queues is ready to be moved to an entry in an outbound queue associated with the outbound port, the outbound queue being capable of storing a multiplicity of inbound queues, a reference to each of the multiplicity of inbound queues being stored in a different one of a plurality of entries in the outbound queue, each of the multiplicity of inbound queues storing a plurality of packets that are to be separately transmitted.

27. The inbound controller as recited in claim 26, further including:
 a module adapted for providing the determined one of the plurality of inbound queues.

28. The inbound controller as recited in claim 26, further including:
 a module adapted for asserting an interrupt when it is determined that one of the plurality of inbound queues is ready to be moved by the CPU to the outbound queue.

29. The inbound controller as recited in claim 26, wherein the packet storing module includes:
 a memory obtaining module adapted for obtaining an available packet buffer from a free pool of available packet buffers;
 a module adapted for placing the inbound packet in the packet buffer; and
 a module adapted for storing the packet buffer in the inbound queue.

30. The inbound controller as recited in claim 26, wherein the module adapted for determining when one of the plurality of inbound queues is ready to be moved to an outbound queue includes:
 a module adapted for determining whether a number of packets in one of the plurality of inbound queues exceeds a maximum number of packets.

31. The inbound controller as recited in claim 26, wherein the module adapted for determining when one of the plurality of inbound queues is ready to be moved to an outbound queue includes:
 a module adapted for determining whether a number of bytes in one of the plurality of inbound queues exceeds a maximum number of bytes.

32. The inbound controller as recited in claim 26, wherein the module adapted for determining when one of the plurality of inbound queues is ready to be moved to an outbound queue includes:
 a module adapted for determining whether a free pool of available memory has been depleted.

33. The inbound controller as recited in claim 26, wherein the module adapted for determining when one of the plurality of inbound queues is ready to be moved to an outbound queue includes:
 a module adapted for determining whether a maximum time limit has been exceeded.

34. An outbound controller for a router, the router having an inbound port and an outbound port, a memory, and a CPU, the outbound controller being adapted for forwarding packets at the outbound port, comprising:
 a module adapted for receiving a notification to handle an inbound queue associated with the inbound port, the inbound queue storing a plurality of packets;
 wherein at least one of the CPU and the memory are adapted for storing an outbound queue associated with the outbound port, the outbound queue being capable of simultaneously storing a plurality of inbound queues in a plurality of entries in the outbound queue, each of the plurality of inbound queues storing a plurality of packets that are to be separately transmitted; and
 a queue transferring module adapted for transferring the inbound queue storing a plurality of packets to a single entry in the outbound queue such that a reference to the inbound queue is stored in the entry in the outbound queue.

35. The outbound controller as recited in claim 34, wherein the module adapted for receiving the notification includes a module adapted for receiving the notification from the CPU.

36. The outbound controller as recited in claim 34, further including:
 a module adapted for transmitting packets stored in the outbound queue.

37. The outbound controller as recited in claim 36, wherein the module adapted for transmitting packets includes:
 a module adapted for selectively discarding packets stored in the outbound queue.

38. The outbound controller as recited in claim 36, wherein the module adapted for transmitting packets stored in the outbound queue includes:
 a module adapted for obtaining a next one of the plurality of inbound queues stored in the outbound queue;
 a packet transmission module adapted for transmitting selected packets stored in the next one of the plurality of inbound queues; and
 a memory releasing module adapted for releasing memory associated with the next one of the plurality of inbound queues.

39. The outbound controller as recited in claim 38, wherein the memory releasing module includes:
 a module adapted for storing the released memory in a free pool of available packet buffers.

40. The outbound controller as recited in claim 38, wherein the released memory forms a new inbound queue to be used by an inbound controller.

41. The outbound controller as recited in claim 38, wherein the released memory forms a queue to be used by the outbound controller during bi-directional operation.

42. The outbound controller as recited in claim 34, wherein the queue transferring module is adapted for transferring the inbound queue to a single entry in the outbound queue according to a priority of the inbound queue.

43. A router having a plurality of inbound ports and a plurality of outbound ports, a memory, and a CPU, comprising:
    an inbound controller coupled to one of the plurality of inbound ports, the inbound controller being adapted for receiving an inbound packet;
    wherein the memory has stored therein:
    a plurality of inbound queues for the one of the plurality of inbound ports, each one of the plurality of inbound queues being capable of storing a plurality of packets that are to be separately transmitted;
    a plurality of outbound queues, each one of the plurality of outbound queues corresponding to one of the plurality of outbound ports and being capable of storing a plurality of inbound queues such that a reference to each of the plurality of inbound queues is stored in a different one of a plurality of entries in the one of the plurality of outbound queues; and
    a classifier coupled to the inbound controller, the classifier being adapted for classifying the inbound packet in a selected one of the plurality of inbound queues according to packet sorting criteria, the selected one of the plurality of inbound queues being associated with one of the plurality of outbound queues;
    wherein the inbound controller is adapted for storing the inbound packet in the selected one of the plurality of inbound queues.

44. The router as recited in claim 43, further including:
    an outbound controller coupled to the inbound controller;
    wherein the inbound controller selects one of the plurality of inbound queues to be transferred to the outbound controller;
    wherein the outbound controller is adapted for storing a reference to the selected one of the plurality of inbound queues in an entry in one of the plurality of outbound queues associated with the packet sorting criteria and transmitting packets stored in the one of the plurality of outbound queues.

45. The router as recited in claim 44, wherein the outbound controller further includes:
    a memory releasing module adapted for releasing selected packet buffers associated with packets stored in the one of the plurality of outbound queues.

46. The router as recited in claim 45, wherein the memory further includes a free pool of available packet buffers and the memory releasing module is adapted for releasing the selected packet buffers into the free pool.

47. The router as recited in claim 44, wherein the outbound controller further includes:
    a memory releasing module adapted for providing a new inbound queue to the inbound controller to replace the selected one of the plurality of inbound queues.

48. The router as recited in claim 43, wherein the inbound controller further includes:
    a memory obtaining module coupled to the classifier, the memory obtaining module being adapted for obtaining memory for an inbound packet to permit the inbound packet to be stored in the selected one of the plurality of inbound queues in which the inbound packet is classified.

49. An encryption system, comprising:
    an inbound controller adapted for receiving an inbound packet;
    a classifier coupled to the inbound controller and adapted for classifying and storing the inbound packet in one of a plurality of inbound queues;
    an outbound controller adapted for receiving the one of the plurality of inbound queues, the one of the plurality of inbound queues storing a plurality of packets to be separately transmitted; and
    an encryption box coupled to the outbound controller, the encryption box being adapted for encrypting the one of the plurality of inbound queues to provide an encrypted inbound queue to the outbound controller for transmission, wherein the outbound controller includes an outbound classifier adapted for classifying the encrypted inbound queue in one of a plurality of outbound queues associated with a plurality of outbound ports, the outbound controller being adapted for storing a reference to the encrypted inbound queue in a single entry in the one of the plurality of outbound queues, and transmitting data stored in the one of the plurality of outbound queues.

50. The method as recited in claim 49, wherein the inbound queue stores therein a plurality of packets, and wherein the encryption box does not encrypt each of the plurality of packets.

51. The method as recited in claim 49, wherein the encryption box is adapted for encrypting the inbound queue as an entity such that a single encryption step is performed.

52. A computer-readable medium storing thereon computer-readable instructions for forwarding a packet in a router, the router having a plurality of inbound ports and a plurality of outbound ports, a memory, and a CPU, the method comprising:
    instructions for providing a plurality of inbound queues for one of the plurality of inbound ports;
    instructions for providing a plurality of outbound queues, each one of the plurality of outbound queues corresponding to one of the plurality of outbound ports and being capable of storing a plurality of inbound queues such that a reference to each of the plurality of inbound queues is simultaneously stored in a different one of a plurality of entries in the one of the plurality of outbound queues;
    instructions for receiving an inbound packet at the one of the plurality of inbound ports;
    instructions for classifying the inbound packet in a selected one of the plurality of inbound queues according to packet sorting criteria;
    instructions for storing the inbound packet in the selected one of the plurality of inbound queues;
    instructions for repeating the steps of receiving, classifying, and storing until an interrupt is asserted; and
    instructions for transferring one of the plurality of inbound queues to one of the plurality of outbound queues corresponding to the packet sorting criteria when the interrupt is asserted such that a pointer to the transferred one of the plurality of inbound queues is stored in one of a plurality of entries in the one of the plurality of outbound queues, the one of the plurality of inbound queues storing a plurality of packets that are to be separately transmitted.

53. An apparatus for forwarding a packet in a router, the router having a plurality of inbound ports and a plurality of outbound ports, a memory, and a CPU, the method comprising:
    means for providing a plurality of inbound queues for one of the plurality of inbound ports;

means for providing a plurality of outbound queues, each one of the plurality of outbound queues corresponding to one of the plurality of outbound ports and being capable of storing a plurality of inbound queues such that a reference to each of the plurality of inbound queues is stored in a different one of a plurality of entries in the one of the plurality of outbound queues;

means for receiving an inbound packet at the one of the plurality of inbound ports;

means for classifying the inbound packet in a selected one of the plurality of inbound queues according to packet sorting criteria;

means for storing the inbound packet in the selected one of the plurality of inbound queues;

means for repeating the steps of receiving, classifying, and storing until an interrupt is asserted; and means for transferring one of the plurality of inbound queues to one of the plurality of outbound queues corresponding to the packet sorting criteria when the interrupt is asserted such that a reference to the transferred one of the plurality of inbound queues is stored in a single one of a plurality of entries in the one of the plurality of outbound queues, the one of the plurality of inbound queues storing a plurality of packets that are to be separately transmitted.

* * * * *